United States Patent
Hozono

(10) Patent No.: US 9,307,110 B2
(45) Date of Patent: Apr. 5, 2016

(54) IMAGE READING DEVICE AND IMAGE FORMING APPARATUS

(71) Applicant: KYOCERA Document Solutions Inc., Osaka-shi, Osaka (JP)

(72) Inventor: Tomohide Hozono, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/668,769

(22) Filed: Mar. 25, 2015

(65) Prior Publication Data

US 2015/0281505 A1    Oct. 1, 2015

(30) Foreign Application Priority Data

Mar. 27, 2014  (JP) ................. 2014-066772

(51) Int. Cl.
  *H04N 1/04* (2006.01)
  *H04N 1/00* (2006.01)

(52) U.S. Cl.
  CPC ........... *H04N 1/0402* (2013.01); *H04N 1/0057* (2013.01)

(58) Field of Classification Search
  CPC .................... H04N 1/0402; H04N 1/0057
  USPC .................. 358/498, 497, 496, 474
  See application file for complete search history.

(56) References Cited

U.S. PATENT DOCUMENTS 6,473,206 B1    10/2002  Fujimoto et al.
2010/0073739 A1*  3/2010  Sekiguchi .............. H04N 1/40
                                            358/474

FOREIGN PATENT DOCUMENTS

JP       2000013575 A    1/2000

* cited by examiner

*Primary Examiner* — Houshang Safaipour
(74) *Attorney, Agent, or Firm* — Alleman Hall McCoy Russell & Tuttle LLP

(57) ABSTRACT

A document conveying portion is configured to convey a document sheet along a conveyance path extending sequentially through a turn-around portion at which a conveyance direction is reversed and a predetermined reading position. A reading unit is movable in a predetermined moving direction below the document conveying portion and a document table and includes a unit housing in which a light source, an optical element, and an image sensor are mounted. The reading unit is formed such that, between the turn-around portion and a first end portion of the document conveying portion which is close to the turn-around portion in the moving direction, a second end portion of the unit housing at a side of the first end portion in the moving direction is located in a state where light is applied from the light source to the reading position.

4 Claims, 3 Drawing Sheets

IMAGE READING DEVICE AND IMAGE FORMING APPARATUS

INCORPORATION BY REFERENCE

This application is based upon and claims the benefit of priority from the corresponding Japanese Patent Application No. 2014-066772 filed on Mar. 27, 2014, the entire contents of which are incorporated herein by reference.

BACKGROUND

The present disclosure relates to an image reading device which reads image data from a document sheet, and an image forming apparatus.

An image reading device capable of reading image data from a sheet placed on a document table may be reduced in size by modifying the arrangement of optical members such as a light source, optical elements (mirrors, lenses), an image sensor, and the like which are used for image reading. Specifically, a technique is known in which size reduction of the device is achieved by fixing some mirrors to a housing.

SUMMARY

An image reading device according to one aspect of the present disclosure includes a document conveying portion, a document table, and a reading unit. The document conveying portion is configured to convey a document sheet along a conveyance path extending sequentially through a turn-around portion at which a conveyance direction is reversed and a predetermined reading position. The document table is provided below the document conveying portion, and a document sheet is placed on the document table. The reading unit is movable in a predetermined moving direction below the document conveying portion and the document table and includes a unit housing in which a light source, an optical element, and an image sensor are mounted. The reading unit is formed such that, between the turn-around portion and a first end portion of the document conveying portion which is close to the turn-around portion in the moving direction, a second end portion of the unit housing at a side of the first end portion in the moving direction is located in a state where light is applied from the light source to the reading position.

An image forming apparatus according to another aspect of the present disclosure includes the above-described image reading device and an image forming portion configured to form an image on a sheet on the basis of image data read by the image reading device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the accompanying drawings in order to allow understanding of the present disclosure. It should be noted that the following embodiment is an example embodying the present disclosure, and, by nature, does not limit the technical scope of the present disclosure.

[Schematic Configuration of Image Forming Apparatus 10]

Figure 1:
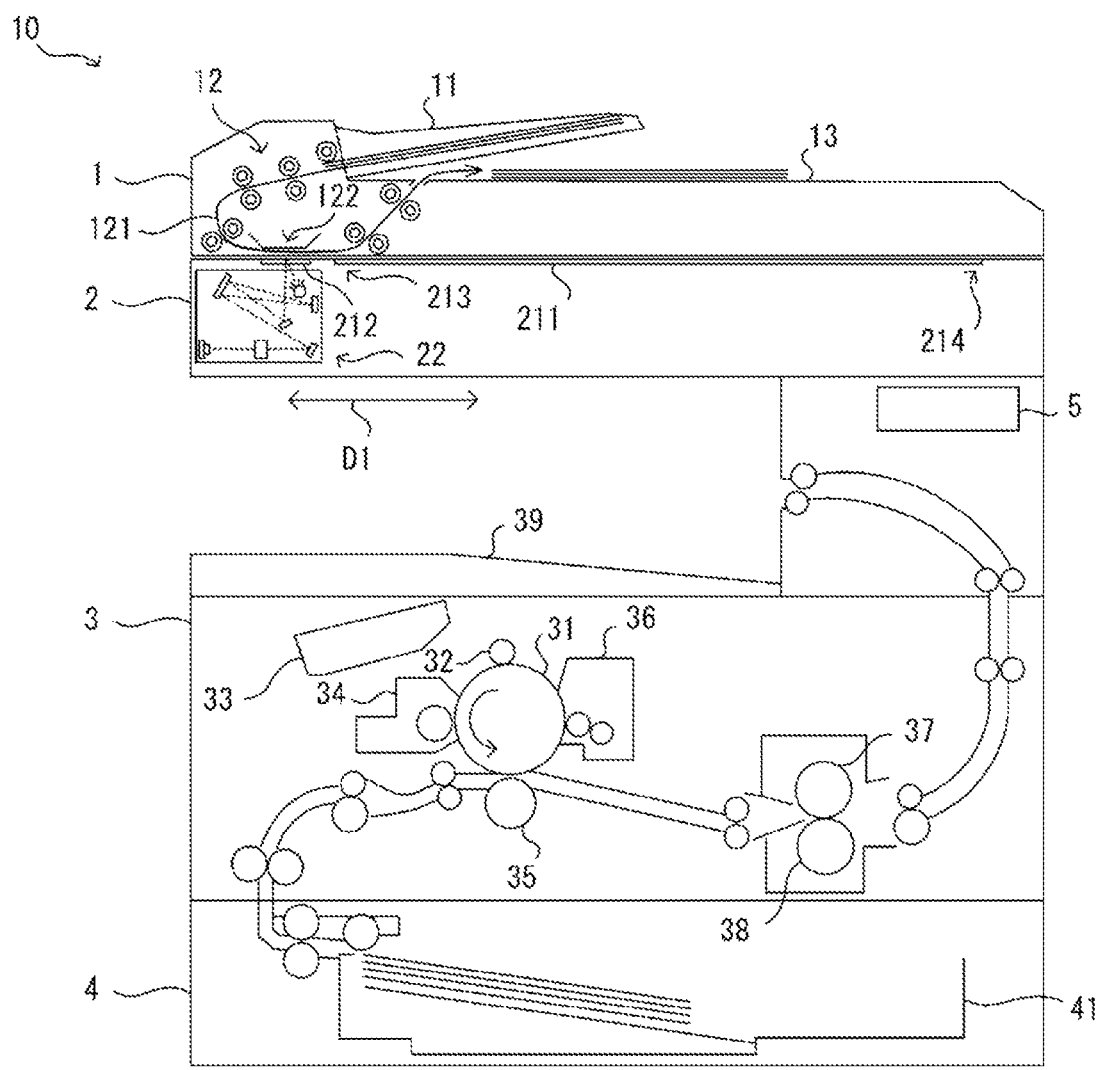
FIG. 1 is a diagram showing the configuration of an image forming apparatus according to an embodiment of the present disclosure.

As shown in FIG. 1, the image forming apparatus 10 is a multifunction peripheral which includes a document conveying portion 1, an image reading portion 2, an image forming portion 3, a sheet feed portion 4, a control portion 5, and the like.

The image forming portion 3 is an electrophotographic type image forming portion which includes a photosensitive drum 31, a charging device 32, an LSU (Laser Scanning Unit) 33, a developing device 34, a transfer roller 35, a cleaning device 36, a fixing roller 37, a pressure roller 38, a sheet discharge tray 39, and the like. The image forming portion 3 forms an image on a sheet fed from a sheet feed cassette 41 of the sheet feed portion 4, on the basis of image data read by the image reading portion 2 or externally inputted image data. The control portion 5 controls each component of the image forming apparatus 10 to execute various operations such as an image reading process, an image forming process, and the like.

The document conveying portion 1 conveys a document sheet set on a document set portion 11, to a sheet discharge tray 13 along a conveyance path 12 on which a plurality of conveying rollers are provided. The conveyance path 12 is a path extending sequentially through: a turn-around portion 121 at which a document conveyance direction is reversed; and a predetermined reading position 122. The reading position 122 is a position at which image data can be read by the image reading portion 2, and is a position irradiated with light from the image reading portion 2.

The image reading portion 2 includes a document table 211, a conveyance reading portion 212, and a reading unit 22. Each of the document table 211 and the conveyance reading portion 212 is a transparent glass provided below the document conveying portion 1 and at an upper surface of the image reading portion 2. A document sheet which is an image reading target is placed on the document table 211. The conveyance reading portion 212 is used in applying light from the reading unit 22 to a document sheet being conveyed by the document conveying portion 1.

The reading unit 22 is movable in a predetermined moving direction D1 (sub-scanning direction) below the document conveying portion 1 and the document table 211.

In the image reading portion 2, image data is read by the reading unit 22 from a document sheet placed on the document table 211 or a document sheet being conveyed by the document conveying portion 1. Specifically, when image data is read from a document sheet placed on the document table 211, the reading unit 22 reads the image data of the document sheet while moving from a position in the moving direction D1 at which light is applied to a predetermined reading start position 213 to a position at which light is applied to a maximum reading position 214. The maximum reading position 214 is a predetermined position corresponding to a maximum size of a document sheet which is readable by the image forming apparatus 10. It should be noted that when image data is read from a document sheet having a size smaller than the maximum size, the reading unit 22 reads the image data from the document sheet while moving from the reading start position 213 to a position before the maximum reading position 214.

When image data is read from a document sheet being conveyed by the document conveying portion 1, the reading unit 22 reads the image data from the document sheet being conveyed by the document conveying portion 1, in a state where the reading unit 22 is stopped at a position in the moving direction D1 at which light is applied to the conveyance reading portion 212.

Next, the internal configuration of the reading unit 22 will be described with reference to FIG. 2.

Figure 2:
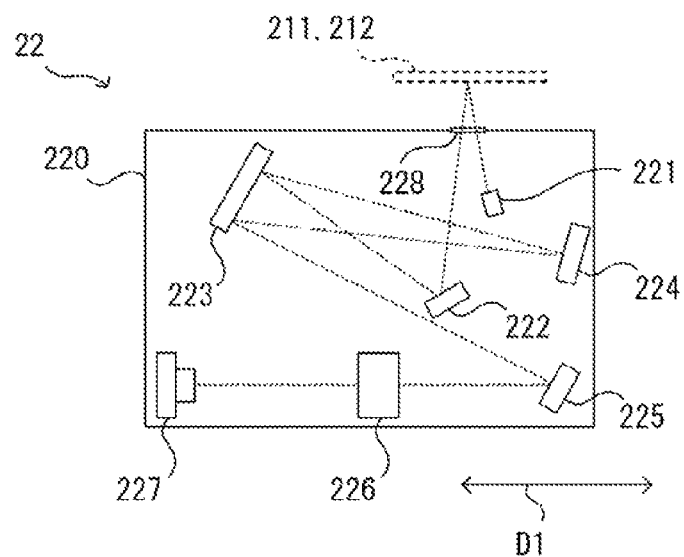
FIG. 2 is a diagram showing the configuration of a reading unit of an image reading portion according to the embodiment of the present disclosure.

As shown in FIG. 2, the reading unit 22 includes a light source 221, mirrors 222 to 225 (an example of an optical element), an optical lens 226 (an example of the optical element), an image sensor 227, and a unit housing 220 in which these components are mounted. In addition, the unit housing 220 is provided with a light-transmitting emission window 228 through which light of the light source 221 is emitted.

The light source 221 includes one or a plurality of white LEDs and emits light which is long in a main-scanning direction (a depth direction in FIG. 2) perpendicular to the moving direction D1, through the emission window 228 toward the document table 211 or the conveyance reading portion 212. The mirrors 222 to 225 are reflection mirrors which guide the light which has been emitted from the light source 221 and reflected on a document sheet, to the optical lens 226. Specifically, the light which has been emitted from the light source 221 and reflected on the document sheet is reflected sequentially on the mirror 222, the mirror 223, the mirror 224, the mirror 223, and the mirror 225 and enters the optical lens 226 as shown by a dotted line in FIG. 2.

The optical lens 226 causes the entering light to be converged on and enter the image sensor 227. The image sensor 227 is, for example, a CCD (Charge Coupled Device), and inputs an electric signal corresponding to an amount of the light received from the optical lens 226, as image data of the document sheet to the control portion 5.

Meanwhile, in the image forming apparatus 10 which includes the document conveying portion 1, the size of the entire apparatus is affected by not only the arrangement of optical members such as the light source 221, the mirrors 222 to 225, the optical lens 226, the image sensor 227, and the like but also the configuration of the document conveying portion 1. For example, if the image forming apparatus 10 does not include the document conveying portion 1, a reading position by the reading unit 22 moves between the reading start position 213 and the maximum reading position 214 on the document table 211. In this case, even when a relationship between the position of an end portion of the unit housing 220 at the reading start position 213 side when the light is applied from the reading unit 22 to the reading start position 213 and the position of an end portion of the unit housing 220 at the maximum reading position 214 side when the light is applied from the reading unit 22 to the maximum reading position 214 is set as appropriate, the size of the image reading portion 2 in the moving direction D1 is not shortened. On the other hand, in the configuration in which the document conveying portion 1 is mounted above the image reading portion 2 as in the image forming apparatus 10, the conveyance reading portion 212 is aligned together with the document table 211 in the moving direction D1. In the document conveying portion 1, a sheet placed on the document set portion 11 is conveyed on the conveyance path 12 sequentially via the turn-around portion 121 and the conveyance reading portion 212. Thus, the document conveying portion 1 has a shape projecting from the reading start position 213 toward a first end portion 1A side. Accordingly, the image forming apparatus 10 according to the present embodiment is reduced in size in consideration of the configuration of the document conveying portion 1.

Figure 3:
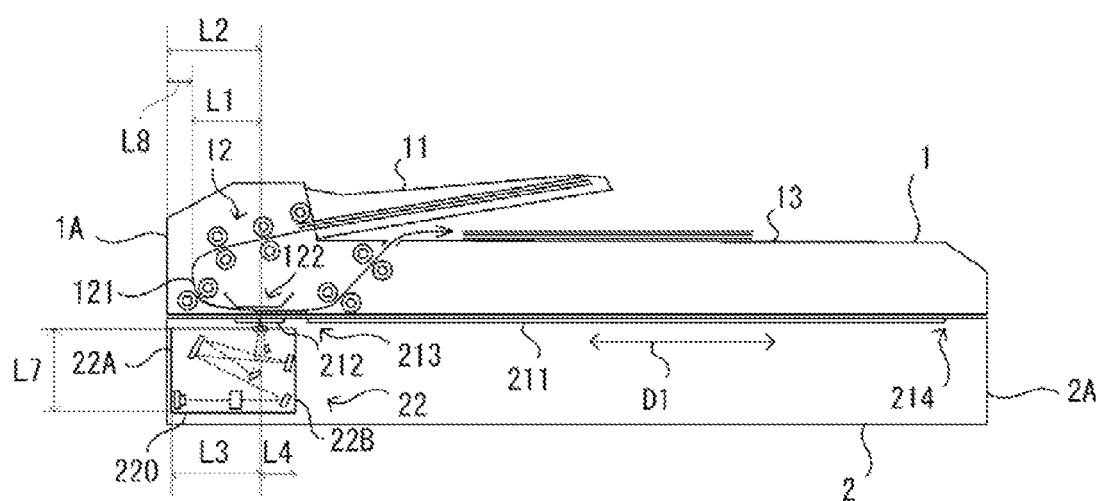
FIG. 3 is a diagram showing the configuration of the image reading portion according to the embodiment of the present disclosure.

Specifically, as shown in FIG. 3, a second end portion 22A of the unit housing 220 at the first end portion 1A side in the moving direction D1 is located between the turn-around portion 121 and the first end portion 1A of the document conveying portion 1 which is close to the turn-around portion 121 in the moving direction D1, in a state where the light is applied from the light source 221 to the reading position 122. That is, a distance L3 between the second end portion 22A of the unit housing 220 and the reading position 122 in the moving direction D1 is longer than a distance L1 between an end portion of the turn-around portion 121 at the first end portion 1A side and the reading position 122. In addition, the distance L3 between the second end portion 22A and the reading position 122 is shorter than a distance L2 between the first end portion 1A and the reading position 122 in the moving direction D1. It should be noted that the width between both ends of the document conveying portion 1 in the moving direction D1 and the width between both ends of the image reading portion 2 in the moving direction D1 are equal to each other.

Thus, in the image forming apparatus 10, a region in the image reading portion 2 corresponding to a region between the turn-around portion 121 and the first end portion 1A of the document conveying portion 1 can be utilized as a space for arranging the reading unit 22. Specifically, the region in the image reading portion 2 corresponding to the region between the turn-around portion 121 and the first end portion 1A of the document conveying portion 1 can be utilized as a region for forming a predetermined optical path length within the reading unit 22. Thus, it is possible to shorten a distance L4 between the reading position 122 and a third end portion 22B of the reading unit 22 which is opposite to the second end portion 22A. Therefore, in the image forming apparatus 10, it is possible to reduce the size of the entire apparatus in consideration of the configuration of the document conveying portion 1.

Figure 4:
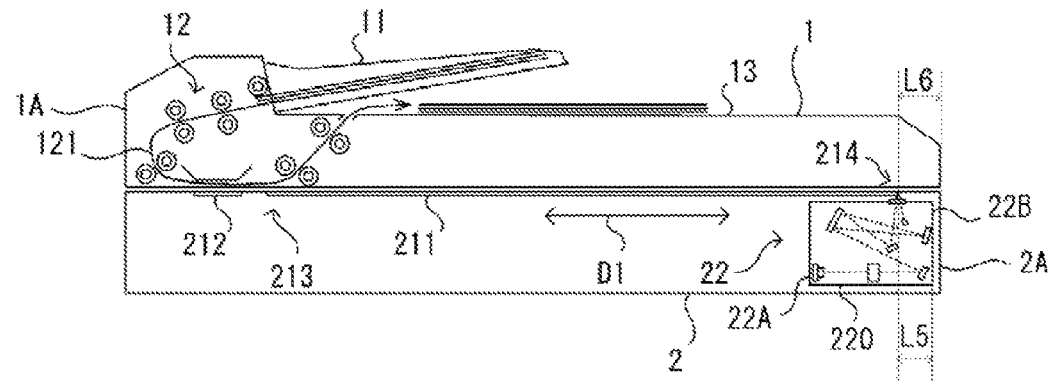
FIG. 4 is a diagram showing the configuration of the image reading portion according to the embodiment of the present disclosure.

Specifically, in the unit housing 220, the distance L3 between the second end portion 22A and the reading position 122 is set so as to be longer than the distance L4 between the reading position 122 and the third end portion 22B of the unit housing 220 which is opposite to the second end portion 22A in the moving direction D1. More specifically, in the reading unit 22, the position of the emission window 228 (see FIG. 2) through which the light is emitted from the light source 221 is set in the reading unit 22 and at a position closer to the third end portion 22B side than the second end portion 22A. In the image reading portion 2, the reading unit 22 is arranged in an orientation (direction) in which the distance L3 from the reading position 122 to the second end portion 22A of the reading unit 22 is larger than the distance L4 from the reading position 122 to the third end portion 22B of the reading position 122. That is, the reading unit 22 is provided in the image reading portion 2 in a state where the second end portion 22A faces the first end portion 1A side. Thus, in the image forming apparatus 10, as shown in FIG. 4, in a state where the light is applied from the light source 221 to the maximum reading position 214 of the document table 211, a distance L5 between the third end portion 22B of the reading unit 22 and the maximum reading position 214 becomes short.

Therefore, it is possible to design a distance L6 between the maximum reading position 214 and a fourth end portion 2A of the image reading portion 2 which is opposite to the first end portion 1A, such that the distance L6 is short, and it is possible to reduce the size of the image forming apparatus 10.

Meanwhile, in the unit housing 220, a dimension L7 in a height direction perpendicular to the moving direction D1 is shorter than the distance L3. More specifically, the dimension of the unit housing 220 is designed such that it is possible to form the predetermined optical path length within the unit housing 220. In this case, during designing of the unit housing 220, after the distance L3 between the reading position 122 and the second end portion 22A is ensured to be as long as possible, the dimension L7 of the unit housing 220 in the height direction is determined. Thus, in the image forming apparatus 10, the dimension L7 of the unit housing 220 in the height direction is reduced by effectively utilizing a distance L8 between the turn-around portion 121 and the first end portion 1A of the document conveying portion 1.

Figure 5:
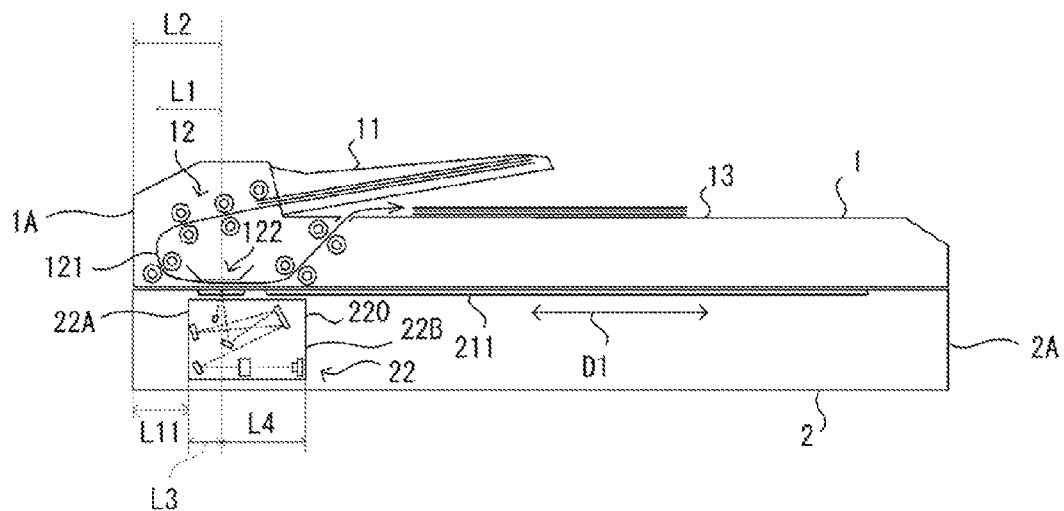
FIG. 5 is a diagram showing the configuration of an image reading portion of a comparative example.
Figure 6:
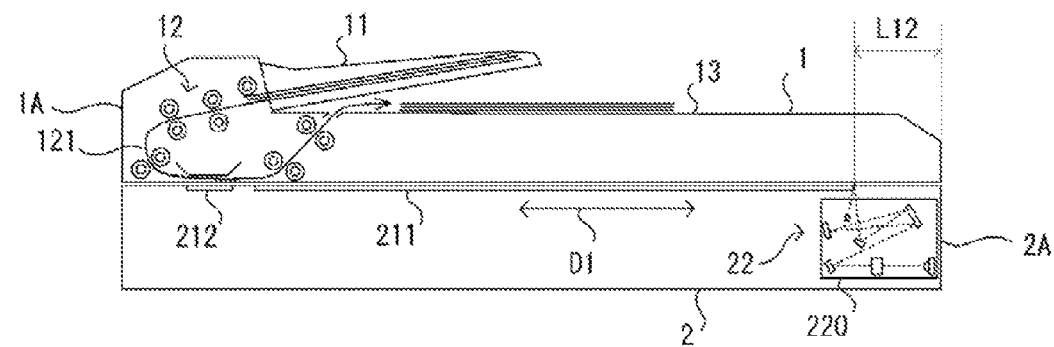
FIG. 6 is a diagram showing the configuration of the image reading portion of the comparative example.

FIGS. 5 and 6 are diagrams showing the configuration of a comparative example for the image forming apparatus 10. In the comparative example shown in FIGS. 5 and 6, in a state where the light is applied from the light source 221 to the reading position 122, the second end portion 22A of the unit housing 220 is located between the turn-around portion 121 and the reading position 122. Specifically, in the comparative example shown in FIGS. 5 and 6, the reading unit 22 is arranged in the image forming apparatus 10 in a state where the reading unit 22 is inverted in the moving direction D1.

In this case, as shown in FIG. 5, in a state where the light is applied from the light source 221 to the reading position 122, the distance L3 between the second end portion 22A and the reading position 122 is shorter than the distance L1 between the reading position 122 and the end portion of the turn-around portion 121 at the first end portion 1A side in the moving direction D1. Thus, a distance L11 between the first end portion 1A and the second end portion 22A of the unit housing 220 in the moving direction D1 is wasted.

With such a configuration, as shown in FIG. 6, in a state where the light is applied from the light source 221 to the maximum reading position 214 on the document table 211, a required distance L12 is lengthened between the maximum reading position 214 and the fourth end portion 2A of the image reading portion 2, and the size of the image reading portion 2 in the moving direction D1 is increased.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   a document conveying portion configured to convey a document sheet along a conveyance path extending sequentially through a turn-around portion at which a conveyance direction is reversed and a predetermined reading position;
   a document table which is provided below the document conveying portion and on which a document sheet is placed; and
   a reading unit movable in a predetermined moving direction below the document conveying portion and the document table, the reading unit including a unit housing in which a light source, an optical element, and an image sensor are mounted, the reading unit being formed such that, between the turn-around portion and a first end portion of the document conveying portion which is close to the turn-around portion in the moving direction, a second end portion of the unit housing at a side of the first end portion in the moving direction is located in a state where light is applied from the light source to the reading position, wherein
   the optical element includes a first mirror, a second mirror, a third mirror, a fourth mirror, and an optical lens, the first mirror, the second mirror, and the optical lens being arranged more on a side of the second end portion of the unit housing than the reading position in the state where light is applied from the light source to the reading position, the third mirror and the fourth mirror being arranged more on a side of a third end portion of the unit housing which is opposite to the second end portion of the unit housing, than the reading position in the state where light is applied from the light source to the reading position,
   the light source is arranged more on a side of the third end portion of the unit housing than the reading position in the state where light is applied from the light source to the reading position,
   the image sensor is arranged more on a side of the second end portion of the unit housing than the reading position in the state where light is applied from the light source to the reading position,
   in the reading unit, light which has been emitted from the light source and reflected on the document sheet is reflected sequentially on the first mirror, the second mirror, the third mirror, the second mirror, and the fourth mirror and enters the image sensor through the optical lens, and
   a dimension of the unit housing in a height direction perpendicular to the moving direction is shorter than a distance between the second end portion of the unit housing and the reading position in the moving direction.

2. The image reading device according to claim 1, wherein a distance between the second end portion of the unit housing and the reading position is longer than a distance between the reading position and the third end portion of the unit housing in the moving direction.

3. The image reading device according to claim 1, wherein a distance between the second end portion of the unit housing and the reading position in the moving direction is longer than a distance between the reading position and an end portion of the turn-around portion at the side of the first end portion and shorter than a distance between the first end portion and the reading position.

4. An image forming apparatus comprising:
   the image reading device according to claim 1; and
   an image forming portion configured to form an image on a sheet on the basis of image data read by the image reading device.

* * * * *